United States Patent [19]

Sekiguchi

[11] 4,387,968
[45] Jun. 14, 1983

[54] ZOOM LENS MOUNT BARREL

[75] Inventor: Tetsuo Sekiguchi, Kumagaya, Japan

[73] Assignee: Asahi Kogaku Kogyo Kabushiki Kaisha, Tokyo, Japan

[21] Appl. No.: 195,681

[22] Filed: Oct. 9, 1980

[30] Foreign Application Priority Data

Oct. 22, 1979 [JP] Japan .......................... 54/146051[U]

[51] Int. Cl.$^3$ ................................................ G02B 7/10
[52] U.S. Cl. ................................................... 350/429
[58] Field of Search ......................................... 350/429

[56] References Cited

U.S. PATENT DOCUMENTS 3,944,340 3/1976 Hashimoto ........................ 350/429

FOREIGN PATENT DOCUMENTS 2825814 1/1979 Fed. Rep. of Germany ...... 350/429

*Primary Examiner*—Vincent P. McGraw
*Assistant Examiner*—Rebecca D. Gass
*Attorney, Agent, or Firm*—Sughrue, Mion, Zinn, Macpeak and Seas

[57] ABSTRACT

A compact and lightweight zoom lens mount barrel in which the number of layers between the outer edges of lenses and the outer surface of the mount barrel is minimized and for which the assembly operation is simplified. A rear lens group moving cam slots is formed in a support sleeve and a fixed connecting sleeve is threadedly engaged with the support sleeve. Front and rear lens support frames are respectively engaged with the outer and inner periphery of the support sleeve. A front lens group moving cam slots is formed in the front lens group support frame. A fixed sleeve is engaged with the connecting sleeve by a stop screw.

6 Claims, 2 Drawing Figures

ZOOM LENS MOUNT BARREL

BACKGROUND OF THE INVENTION

The present invention relates to a compact and lightweight zoom lens mount barrel.

There has been heretofore provided a zoom lens mount barrel having a separate cam or drive sleeve including a plurality of cam or lead slots therein for moving front and rear lenses in the optical axis direction. For this reason, it is very difficult to miniaturize the zoom lens mount barrel diameter. Also, disadvantageously, in the prior art mount barrel a suitable washer must be inserted between the lens mount and the fixing member thereof in order to adjust the distance from the end of the lens to the image surface. Because of this, the prior art adjustment mechanism required a complex assembly operation.

Referring to FIG. 1 showing a prior art zoom lens mount barrel, reference numeral 1 designates a lens mount, 2 a rear distance minute adjustment washer, 3 a fixed sleeve attached to the lens mount 1, 4 a zoom operational ring or sleeve, 4a an axial groove formed along the optical axis in the zoom operational sleeve 4, and 5 a drive sleeve slidably disposed within a forwardly extending portion 3a of the fixed sleeve 3 and in which is provided cam slots 5b and 5c and a pin 5a which is engaged with the above described axial groove 4a. An escape slot 3b is circumferentially formed in the fixed sleeve 3. A first support frame or sleeve 6 supporting a front lens group 1 is provided with a pin 6b which engages with the above-described cam slot 5c. A second support frame or sleeve 7 supporting a rear lens group II is provided with a pin 7a which engages with the above described cam slot 5b, a guide slot 6a formed parallel to the optical axis in the support frame 6 and a guide slot 3d formed parallel to the optical axis in a forwardly extending portion 3c of the fixed sleeve 3. The above described support frames 6 and 7 are engaged respectively with the exterior and interior surfaces of the extended portion 3c of the fixed sleeve 3. The front lens group I is independently moved back and forth by the rotation of the distance operational barrel or sleeve 8 to thereby achieve focusing. An index barrel 9 is coupled to the fixed sleeve extended portion 3a.

With this construction, when the zooming operational sleeve 4 is rotated, the drive sleeve 5 and hence the cam slots 5b and 5c are rotated together due to the engagement of the pin 5a and the groove 4a. On the other hand, the pin 7a and hence the second support frame 7 are prevented from rotating by the slot 3d while the support frame 6 and hence the pin 6b are also prevented from rotating. As a result, the support frames 6 and 7 are moved in the axial direction to achieve the zooming.

As may be seen from FIG. 1, the zooming mechanism includes six layers, namely, in order from the outside, the zooming operational sleeve 4, the fixed sleeve extended portion 3a, the drive sleeve 5, the front lens group support frame 6, the fixed sleeve extended portion 3c and the rear lens group support frame 7. Therefore, because of the relatively high number of layers, the outer diameter of the lens mount barrel must necessarily extend quite far beyond the periphery of the lens groups. Also, since the final dimensional adjustment for the rear distance from the rear end of the lens to the image surface is only known after the thickness of the washer 2 has been determined and the zoom lens assembled, the assembly operation of the zoom lens is time-consuming and troublesome.

SUMMARY OF THE INVENTION

An object of the present invention is to provide a compact and lightweight zoom lens mount barrel in which the assembling operation is improved, overcoming the above noted defects inherent to the prior art lens mount barrel.

This as well as other objects of the invention are met by a zoom lens mount barrel in which the positions of front and rear lens groups are restricted in the optical axis direction by the rotation of a zooming operational sleeve and by the action of cam slots. A support sleeve has a rear lens group moving cam slots formed therein. A fixed connecting sleeve is threadingly engaged with the support sleeve. Front and rear lens support frames are engaged with an outer periphery and inner periphery, respectively, of the support sleeve. A front lens moving cam slot is formed in the front lens support frame.

DESCRIPTION OF THE PREFERRED EMBODIMENTS

Figure 2:
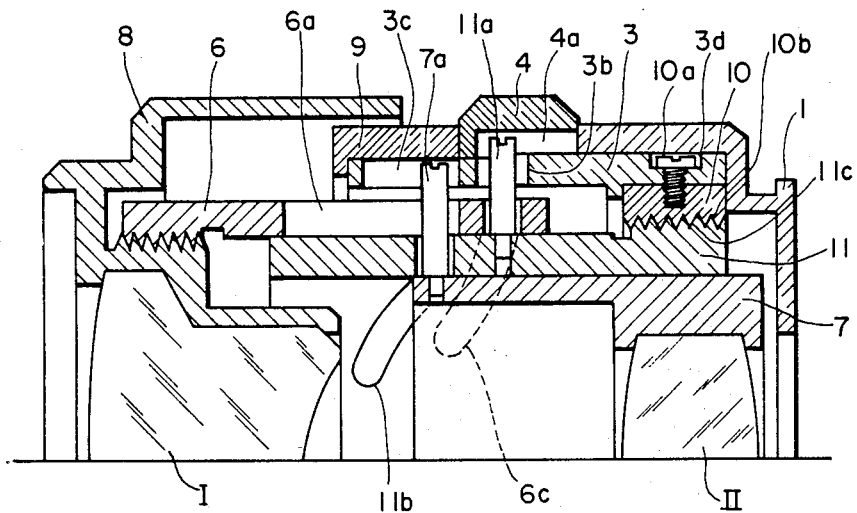
FIG. 2 is a half cross-sectional view showing a lens mount barrel constructed according to the present invention.

FIG. 2 is a half cross-sectional view showing a preferred embodiment of a zoom lens mount barrel constructed according to the present invention. Reference numeral 1 designates a lens mount, 3 a fixed sleeve attached to the lens mount 1, 3b a circumferential escape slot formed in the fixed sleeve 3, 3c a guide slot formed parallel to the optical axis in the fixed sleeve 3, 4 a zooming operational sleeve, 4a a groove formed parallel to the optical axis in the zooming operational sleeve 4, 6 a first support frame supporting a front lens group I, 6a a guide slot formed parallel to the optical axis direction in the first support frame 6, and 6c a cam slot for moving the front lens group I formed in the support frame 6. A pin 7a, which is rigidly coupled to a second support frame 7, supporting a rear lens group II, is engaged with the guide slots 3c and 6a. The front lens group I is moved independently by rotation of a distance operational sleeve 8 to perform focusing. An index sleeve 9 is coupled to the fixed sleeve 3. A connecting sleeve 10 is adjustably coupled to the fixed sleeve 3 by a circumferential groove 3d and a stop screw 10a. In the inner surface of the connecting sleeve 10 is provided a screw thread 10b. A support sleeve 11 supports the front and rear group support frames 6 and 7, respectively. A pin 11a rigidly coupled to the support sleeve 11 is engaged with the groove 4a and the cam slot 6c through the above described escape slot 3b. Also, the pin 7a is engaged with a rear lens group moving cam slot 11b. A screw thread 11c at the rear end of the support sleeve 11 is threadingly engaged with the screw thread 10b.

With this construction, when the zooming operational sleeve 4 is rotated, the support sleeve 11 is rotated due to the engagement of the slot 4a and pin 11a. On the other hand, rotation of the pin 7a and the rear lens group support frame 7 is prevented by the guide slot 3a while the rotation of the front lens group support frame 6 is also prevented by the guide slot 6a. Therefore, when the support sleeve 11 is rotated, the support frames 6 and 7 are moved parallel to the optical axis by action of the cam slots 6c and 11b to thereby perform a zooming operation.

Figure 1:
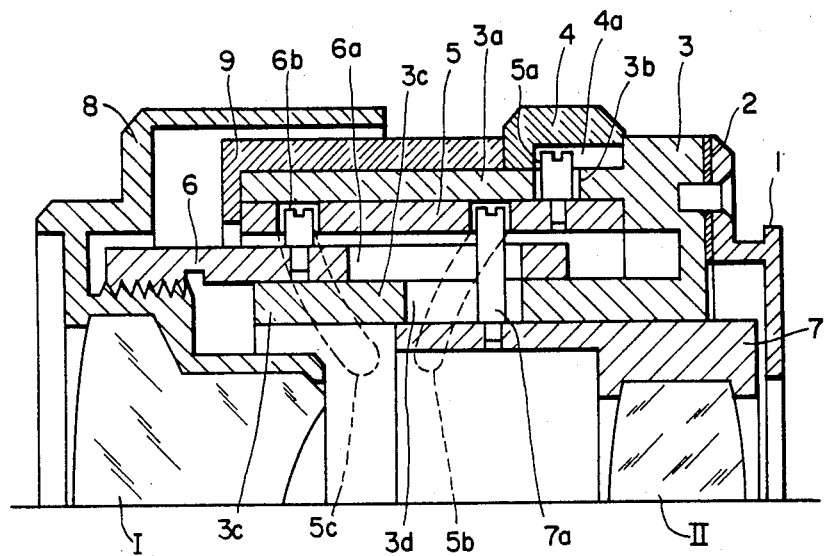
FIG. 1 is a half cross-sectional view showing a prior art lens mount barrel.

In the zoom lens mount barrel constructed according to the present invention, a front lens group moving cam slot 6c is formed in the front lens group support frame 6 and a rear lens group moving cam slot 11b is formed in the support sleeve 11 so that no drive sleeve such as the drive sleeve 5 in the prior art arrangement of FIG. 1 in which cam slots 5c and 5b are formed is required. With the invention, the zooming operation is implemented with only five layers. This is very effective for decreasing the outer diameter of the zoom lens mount barrel. Also, due to the use of the connecting sleeve 10 in the mount barrel of the invention, if the sleeve 10 is adjusted in the circumferential direction relative to the fixed sleeve 3 and then coupled thereto, the front and rear lens groups can be moved integrally back and forth to thereby set the distance from the rear end of the lens to the image surface.

What is claimed is:

1. A zoom lens mount barrel, comprising:
   a zooming operational sleeve (4);
   a support sleeve (11) having inner and outer peripheries and having a rear lens group moving cam slot (11b) formed therein;
   a fixed connecting sleeve (3, 10) threadingly engaging said support sleeve;
   a rear lens support frame (7) slidable with respect to said inner periphery of said support sleeve;
   a front lens support frame (6) slidable with respect to said outer periphery of said support sleeve and having a front lens group moving cam slot (6c) formed therein;
   a first pin (7a) at a fixed circumferential position and secured to said rear lens support frame, said first pin engaging said rear lens group moving cam slot; and
   a second pin (11a) rotatable with said zooming operational sleeve around the circumferential direction of said zoom lens mount barrel, said second pin engaging said front lens group moving cam slot.

2. The zoom lens mount according to claim 1, wherein said fixed connecting sleeve comprises a fixed sleeve portion and a connecting sleeve portion, said connecting sleeve portion being engaged with said fixed sleeve and adjustable with respect to said fixed sleeve in the circumferential direction.

3. The zoom lens mount according to claim 2, further comprising a stop screw for engaging said fixed sleeve and said connecting sleeve to fix the relative circumferential positions thereof.

4. A zoom lens mount barrel as claimed in claim 1, further comprising an axial groove (3c) formed in said fixed sleeve, and wherein said first pin is secured to said rear lens support frame and extends through said rear lens group moving cam slot to engage said axial groove formed in said fixed sleeve.

5. A zoom lens mount barrel as claimed in claim 1 or 4, further comprising an axial groove (4a) formed in said zooming operational sleeve, and wherein said second pin is fixedly secured to said support sleeve and extends through said front lens group moving cam slot to engage said axial groove formed in said zooming operational sleeve.

6. A zoom lens mount barrel comprising: a lens mount; a fixed sleeve coupled to said lens mount, said fixed sleeve having a circumferential escape slot, a guide slot extending parallel to the optical axis of said zoom lens mount barrel, and a circumferential groove formed therein; a first support frame for supporting a front lens group, said first support frame having a guide slot extending parallel to said optical axis and a cam slot for moving said front lens group formed therein; a second support frame for supporting a rear lens group; a first pin rigidly coupled to said second support frame engaged with said guide slot formed in said fixed sleeve and said guide slot formed in said first support frame; an index sleeve rigidly coupled to said fixed sleeve; a connecting sleeve adjustably coupled to said fixed sleeve by a stop screw which is rigidly coupled to said connecting sleeve and which is engaged with said circumferential groove formed in said fixed sleeve; a support sleeve for supporting said front and rear lens group support frames, said support sleeve being threadingly engaged with said connecting sleeve, and said support sleeve having a moving cam slot for moving said rear lens group arcuately formed therein, said first pin being engaged with said moving cam slot; and a second pin rigidly coupled to said support frame, said second pin being engaged with said cam slot formed in said first support frame and, through said escape slot formed in said fixed sleeve, with a groove formed in a zooming operational sleeve.

* * * * *